United States Patent [19]

Bergmann et al.

[11] Patent Number: 5,486,151
[45] Date of Patent: Jan. 23, 1996

[54] MACHINING CENTER FOR MACHINING A WORKPIECE BY MEANS OF AT LEAST TWO INTERCHANGEABLE TOOLS

[75] Inventors: Klaus Bergmann, Melinde; Jacques Schwab; Martin Frauenfelder, both of Breganzona, all of Switzerland

[73] Assignee: Mikron S. A. Agno, Switzerland

[21] Appl. No.: 64,026

[22] PCT Filed: Sep. 16, 1992

[86] PCT No.: PCT/EP92/02125

§ 371 Date: Sep. 10, 1993

§ 102(e) Date: Sep. 10, 1993

[87] PCT Pub. No.: WO93/05926

PCT Pub. Date: Apr. 1, 1993

[30] Foreign Application Priority Data

Sep. 19, 1991 [CH] Switzerland .............................. 2780/91
Feb. 27, 1992 [CH] Switzerland .............................. 603/92

[51] Int. Cl.$^6$ .................................................. B73Q 3/157
[52] U.S. Cl. .................................................. 483/1; 483/56
[58] Field of Search .............................. 483/52, 44, 37, 483/32, 46, 48, 1, 55, 56; 29/22 A

[56] References Cited

U.S. PATENT DOCUMENTS

| | | | |
|---|---|---|---|
| 3,414,967 | 12/1968 | Erikson | 483/52 |
| 3,646,664 | 3/1972 | Veril et al. | 483/524 |
| 4,221,043 | 9/1980 | Dudley | 483/44 |
| 4,227,296 | 10/1980 | Wittenbreder | 483/46 |
| 4,571,813 | 2/1986 | Fukuoka et al. | 483/37 |
| 4,602,901 | 7/1986 | Ramusino | 483/32 |
| 4,932,118 | 6/1990 | Winkler | 483/48 |
| 5,107,910 | 4/1992 | Sasaki | 29/26 A X |
| 5,133,128 | 7/1992 | Katayama et al. | 483/44 |

FOREIGN PATENT DOCUMENTS

| | | | |
|---|---|---|---|
| 9015333 | 4/1991 | Germany . | |
| 202241 | 12/1983 | Japan | 483/52 |
| 59-69242 | 4/1984 | Japan . | |
| 61-95845 | 5/1986 | Japan . | |
| 61-219548 | 9/1986 | Japan . | |
| 180536 | 7/1990 | Japan | 483/1 |
| 1444126 | 12/1988 | U.S.S.R. | 483/52 |

*Primary Examiner*—William Briggs
*Attorney, Agent, or Firm*—Evenson, McKeown, Edwards & Lenahan

[57] ABSTRACT

A workpiece is clamped onto a worktable that can travel in at least three directions at right angles to each other relatively to each of several tools. The tools which are inserted each in an individually driven work spindle with only one of the spindles cutting at a time. The spindles are located in a stationary spindle support or in spindle supports permitting linear travel. The workpiece and the tools are brought into contact by numerically controlled movements in the Z-direction, in the X- and Y-directions or in the X- and Z-directions. An automatic tool changing device cooperates with the spindles and with at least one tool magazine. For changing tools, one or one each changer arm or comparable device can work in conjunction with a spindle and with at least one tool magazine.

3 Claims, 3 Drawing Sheets

MACHINING CENTER FOR MACHINING A WORKPIECE BY MEANS OF AT LEAST TWO INTERCHANGEABLE TOOLS

BACKGROUND AND SUMMARY OF THE INVENTION

The present invention relates to a Machining Center for machining a workpiece by of one out of at least two, automatically interchangeable, tools that are each clamped in an individually driven work spindle and can be applied alternately to the workpiece by numerically controlled movements.

When machining workpieces, the cycle time required for completion comprises machine time, during which the workpiece is physically modified, and also downtime required for all non-productive operations, such as changing workpieces or changing tools on the machine.

For small components with machining cycles requiting different tools, downtime takes up an important fraction of the total cycle time. Due to the short machine time typical for such components and the relatively long chip-to-chip time due to changing tools, downtime can even exceed machine time. In such cases machining of the workpieces does not represent an economic optimum.

Devices are known with spindles applied alternately that aim also at reducing chip-to chip time. Such a device applicable to existing machine tools is described, for example, in the registered design DEV-9015333. It comprises two work spindles, a drive- and a positioning-motor and groups of pinions and clutches. This device permits the changing of tools simultaneously with machine time but still does not resolve the problem of the long chip-to-chip time, as the individual steps of operation, e.g. "unlock indexing", "brake spindle", "actuate clutch", "accelerate spindle" and "unlock indexing" still are sequential in time. No time is thus gained as compared with rapid conventional solutions.

Also similar machines with two individually driven work spindles are known. They are fitted to a common spindle support in opposite directions by 180°. The changing operation is effected by rotating the spindle support by 180°. An example for this is the metal-cutting machine sold under the trademark MONOPOSTO of the CMS OPTICAL company, that makes it possible to carry out movements in parallel operation. However, the relatively long half-circle described during rotation for changing as well as the need for locking and unlocking operations due to the not numerically controlled changing process do not permit appreciable savings in time as compared with rapid conventional solutions.

In addition devices or machines are known such as the ones mentioned above, in which the attempt is made to compensate for the unfavorable influence of the time required for the tool change on the cycle time used to complete an individual workpiece by applying simultaneously several tools to several workpieces. For example, DE 4020997A1 and CH-654237 show machine tools with several spindles for interchangeable tools, the spindles with axes parallel to each other being fitted to a common spindle support. In these machines each spindle machines one particular workpiece with a single tool. For changing tools, the entire spindle support is moved to a changing position. During the time required for this operation (displacement of the spindle support to the changing position, changing of tools, return of the spindle support to the working position) no workpiece can be machined thereby. The unfavorable ratio for machine time to downtime in such a two-spindle machine can only be improved by using several parallel spindles (actually up to eight spindles are used). A very serious drawback of this solution is that, when changing workpieces adjustment work required for alignment of the workpieces is unproportionally time consuming, thus reducing overall productivity and flexibility.

CH-666432 shows a machine tool with two spindles with parallel axes for the workpieces and with two turrets with parallel axes for various tools. The same workpiece can either be machined simultaneously with two tools or in sequence by one single tool in each of the two turrets whereby, collision of file tools or of the turrets is avoided. Automatic changing of tools stored in a magazine is not provided however, in any event, this could only be performed by using the tools previously fitted to each single turret. Thus the improved ratio of machine time to downtime is again deteriorated by the loss in overall productivity and flexibility of the machine. Also the choice of available tools is rather limited.

An object of the present invention is to provide a machining center of the kind mentioned above in such a way as to improve the ratio of machine time to downtime, as compared with the state of the art, without loss of flexibility of the machine tool.

This object has been is achieved in a machining center built according to the present invention by engaging one single spindle out of at least two individually driven spindles, while simultaneously the spindle not engaged is automatically fitted with a new tool in a manner already known. All other movements that determine the chip-to-chip time are performed parallel in time to the movements of the other spindle. These movements are "retract tool from workpiece", "brake down spindle", "accelerate spindle" and "approach tool to workpiece".

In addition, all movements required for the changing of spindles are entirely numerically controlled, thus making any additional locking unnecessary. The ratio of machine time to downtime due to the tool change becomes thus considerably more favorable than known at the present state of the art. At the best, the chip-to-chip time can thus be reduced to the value of the feed time of the working spindle or of the workpiece. Technical realization of the present invention is based on alternate and simultaneous travel to various positions of tool change and possibly of chipmaking along numerically controlled axes. Chip-to-chip time depends, therefore, on the attainable speed and acceleration of an NC-axis in rapid traverse.

In the machining center according to the present invention all spindle axes are preferably parallel to each other and linear. As a result, tool change is advantageously performed for all tools similarly and in the same direction, and a minimal number of axes is required for complete translatory movement in space between tool and workpiece. Three linear axes are sufficient. Any additional axis is not required for the actual cutting except for the tool change process or for the protection of a spindle.

In order to obtain the advantage of being able to engage the workpiece with the tool at low expenditure in four, or five directions, the worktable is made to rotate about one or two rotation axes, these axes of rotation together with the axis of the spindle constituting a two or three-dimensional basis respectively.

In one of the preferred configurations of the machining center, the spindles with parallel axes are stationary in space and the worktable moves about three axes that are orthogonal to each other, one of them being parallel to the spindle axes. In this configuration, the worktable is supported over an outrigger by the nearest of the three slides in such a manner that its longitudinal axis is at fight angles to the axes of the spindles and possibly to the connecting line of the parallel spindles In another preferred configuration of the machining center, the spindles with parallel axes can be moved in an equally parallel direction. Two linear axes for the worktable movement consitute together with the linear axes of movement of the spindles an orthogonal three-dimensional basis. Here, taking of a tool from and returning it to a magazine can be effected preferably by an additional movement of the magazine without a changer arm.

In again another preferred configuration of the machining center, the spindles with parallel axes are placed in spindle supports that can be moved in planes that are also parallel to each other. A single installed linear axis for the worktable movement constitutes together with the axes of the spindle support planes a three dimensional basis. The taking of the tool from and returning it to a magazine is in this case preferably effected without changer arm and without magazine movement.

All preferred configurations are fitted, as described above, with a worktable, rotatable about respectively one or two axes in order to permit presentation of the workpiece at small expenditure to the tool in four or five directions.

BRIEF DESCRIPTION OF THE DRAWINGS

These and other objects, features and advantages of the present invention will become more readily apparent from the following detailed description of currently preferred embodiments when taken in connection with the accompanying drawings wherein.

DETAILED DESCRIPTION OF THE DRAWINGS

Figure 1:
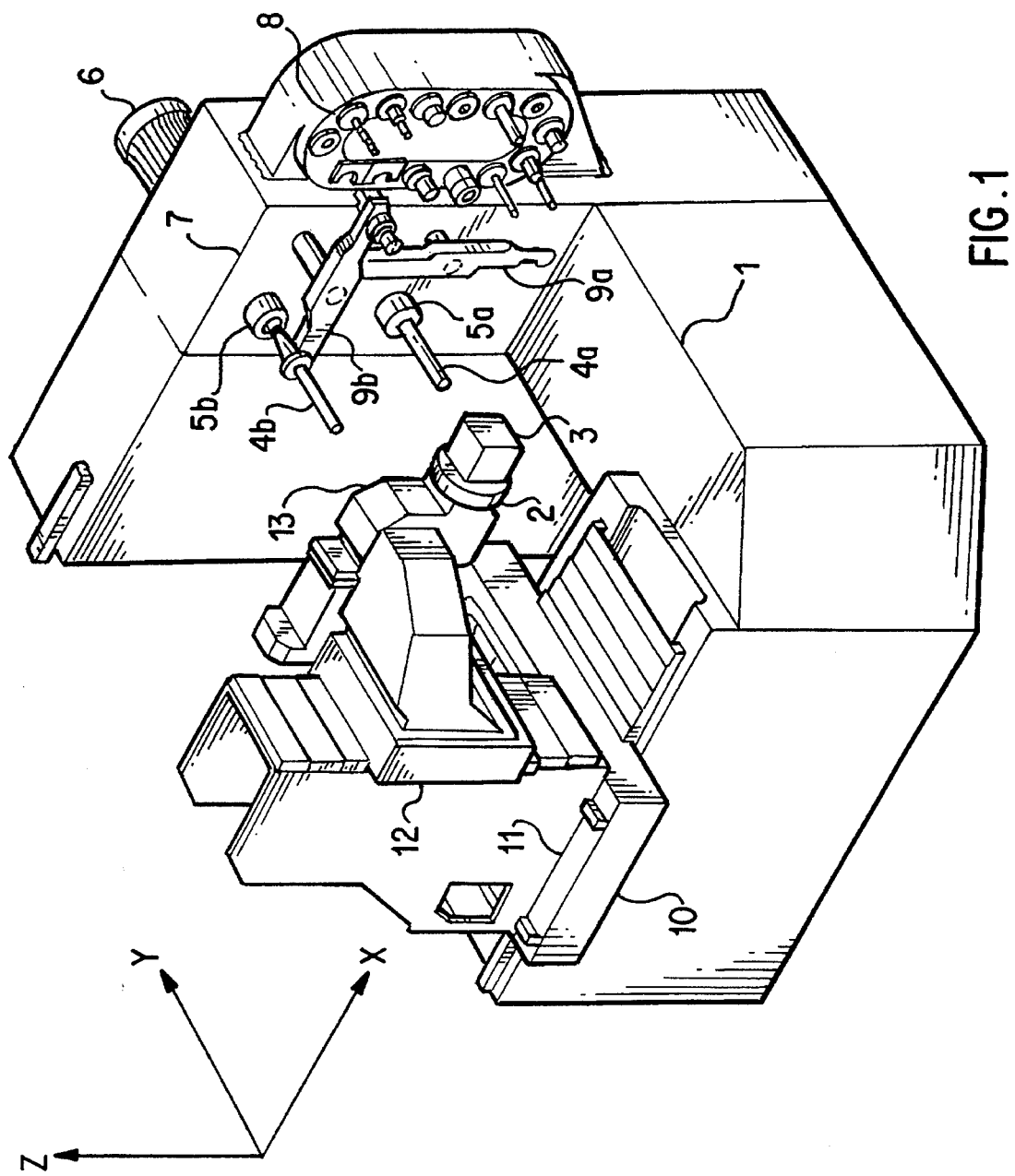
FIG. 1 is a perspective view of one embodiment of a machining center embodying the present invention wherein spindles with paralle axes are stationary and the worktable moves about three orthogonal axes.

In FIG. 1, a machine bed 1 supports a movable worktable 2 on which the workpiece 3 to be machined is clamped. Two tools 4a, 4b are provided for machining the workpiece 3. One of the tools 4a, is shown ready for use, inserted into a spindle 5a, which is rotatable about its spindle axis (not shown), driven by of a drive motor (not visible). The other tool 4b is shown in a position during tool change in front of a spindle 5b. It is one of two possible positions in which the tool 4b is either presented prior to its insertion into the spindle 5b or has been extracted after machining from the spindle 5b for the purpose of a tool change. Also the spindle 5b is rotatable about its spindle axis (not shown), by a drive motor 6.

The spindles, 5a, 5b are not slidable and are fitted to a common spindle support 7, which is stationary with respect to the machine bed 1. The spindle axes are horizontal and parallel to the direction along axis Y shown in the Figure.

In order to permit automatic tool change, the tools 4a, 4b are inserted interchangeably into spindles 5a, 5b. In FIG. 1, the machining center is fitted with an automatic tool changing device that operates together with spindles 5a, 5b and a tool magazine 8. The device comprises two changer arms 9a, 9b that are each assigned to one of the spindles 5a, 5b. The changer arm 9a cooperates with the spindle 5a and the tool magazine 8, whereas the changer arm 9b cooperates with the spindle 5b and the tool magazine 8 in order to perform the automatic tool change. Automatic tool change involving a changer arm in cooperation with a spindle and a tool magazine is already known and is not required to be described in greater detail here. In the illustrated embodiment of FIG. 1, the changer arms 9a, 9b are each fitted to an axis parallel to the spindle axes. On the actual machining center, the distance between changer arms 9a, 9b is as will be readily apparent sufficient to avoid collision.

The above description refers to the example of a configuration comprising two tools 4a, 4b and one tool magazine 8. It can, however, be easily applied to a greater number of tools and tool magazines. To each tool there is always a spindle assigned and a changer arm to the latter. However, the tools can be contained in either a common tool magazine or in several tool magazines assigned to the individual spindles.

Figure 2:
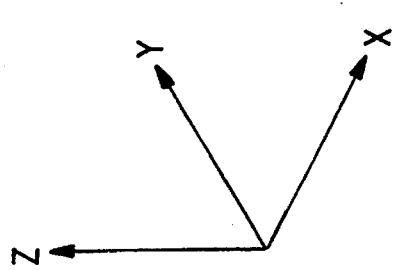
FIG. 2 is a perspective view of a second embodiment of a machine center according to the present invention in which two spindles with parallel axes can be moved in a parallel direction.
Figure 2:
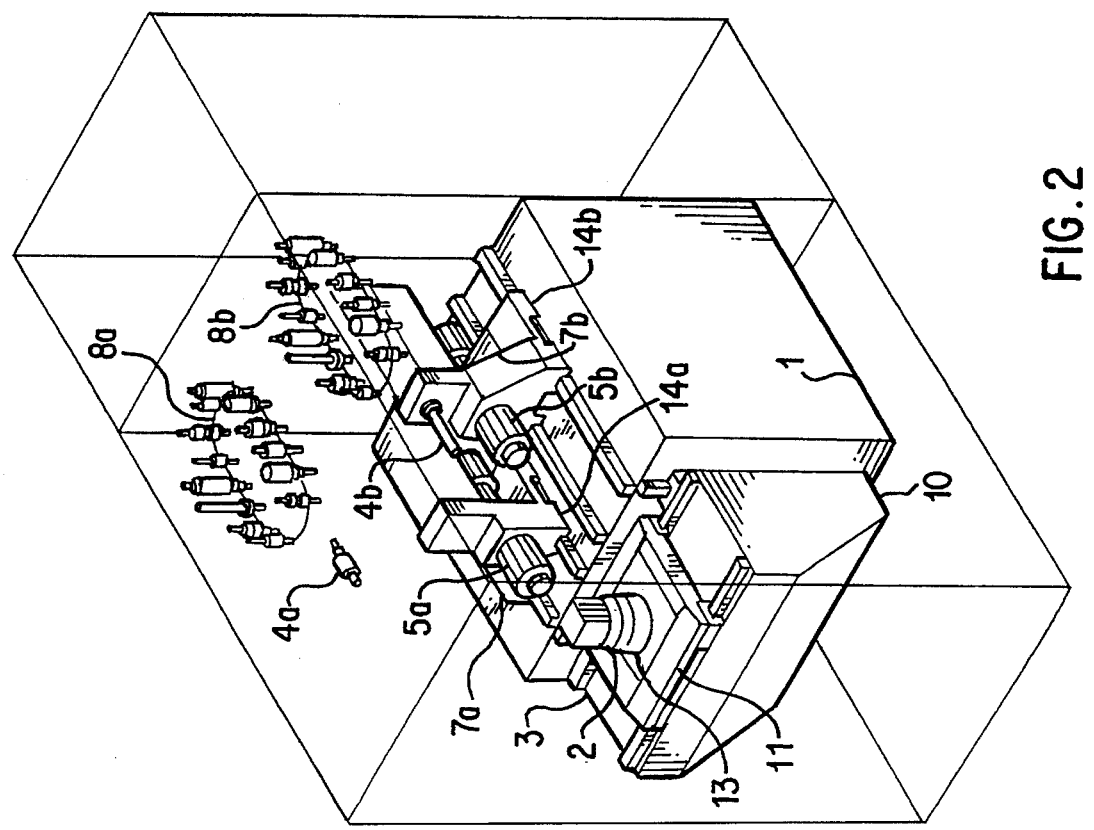
Figure 3:
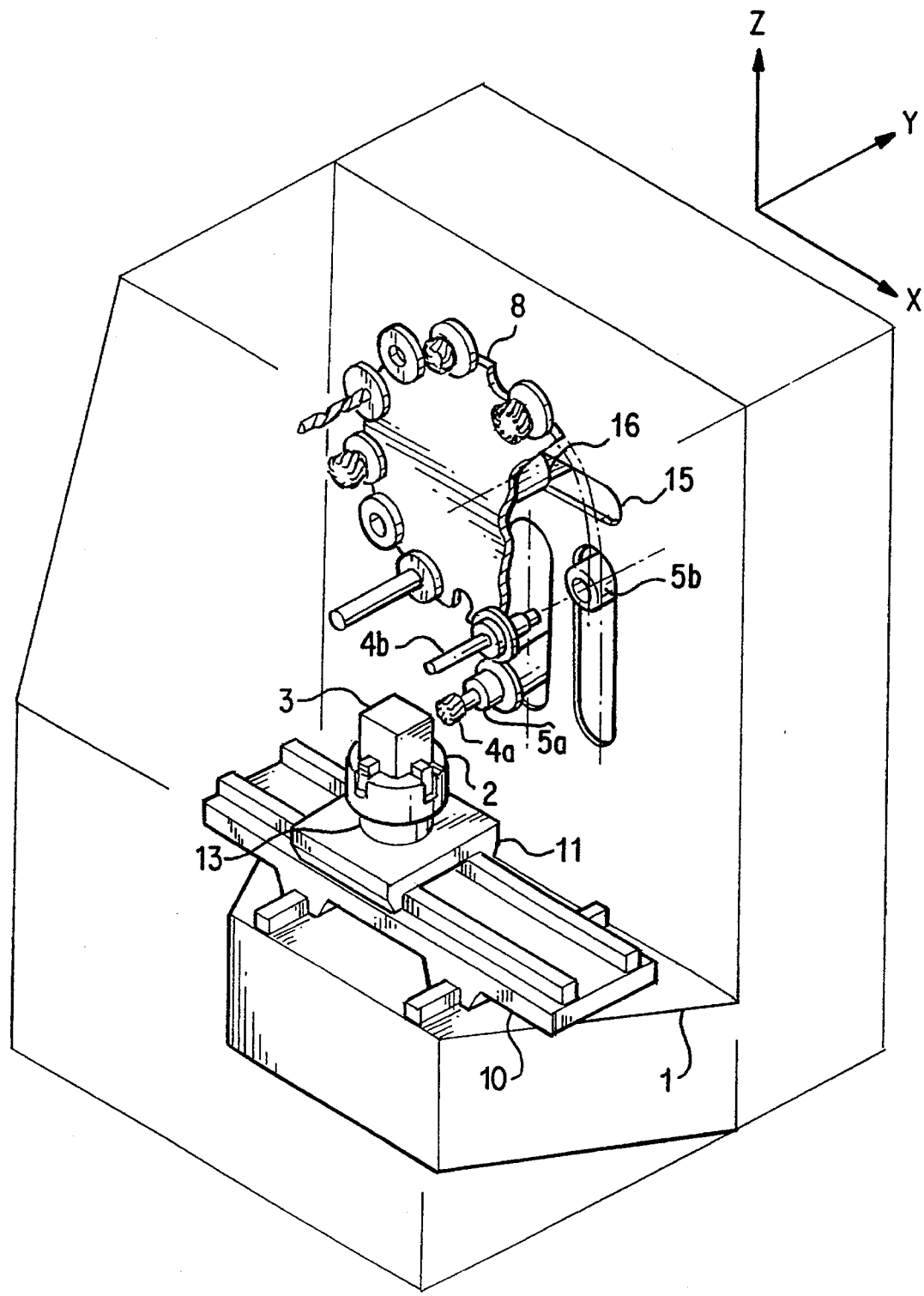
FIG. 3 is a perspective, partially cut-away view of a third embodiment of a machining center similar to that shown in FIG. 2 but in which taking of a tool from and to a magazine is effected by an additional movement of the magazine without a changer arm.

FIGS. 2 and 3 show two other presently contemplated embodiments for machining centers according to the present invention. They are provided with four linear axes and one axis of rotation for the worktable 2. In both embodiments, two spindle supports 7a, 7b (not shown in FIG. 3) are provided, that can travel separately along one axis each. It is thus easier to protect the spindle 5b from chips during the tool change.

In FIG. 2, one of the slideways for a spindle support is shown. It is oriented in the Y-direction of the spindle axis and permits the Y-displacement of the three linear axes. The X- and Z-movements are performed by the worktable 2. For changing the tools 4a, 4b, two magazines 8a, 8b are provided requiring also two conventional changer arms (not illustrated).

In FIG. 3 the spindle supports are mobile in the Z-direction. The worktable 2 must therefore be free to travel in the X- and Y-directions. Here the tool change is effected by a magazine 8 that in addition to the usual rotary movement, offers free linear travel in the X- and Y-directions to permit the tool change process to be performed. Another configuration of this embodiment incorporates two magazines, one out of these being assigned to each spindle. These magazines can travel only in the Y-direction.

For the worktable 2 and its support on machine bed 1 in the last two examples (FIGS. 2 and 3), the same principle applies as the one proposed in FIG. 1, with the difference however, that now only travel along two linear axes is required.

These two linear axes are oriented in such a manner that, together with the other linear axes, an orthogonal three-dimensional basis is constituted.

In all the configurations described, the spindle axes are parallel to each other. Other configurations are however possible, in which some or all spindle axes are slanting or skew with respect to each other. Also worktable travel by way of the slides can be oriented in other directions than parallel to a spindle axis, and the axis of rotation of the worktable can be oriented differently with respect to the nearest slide than at right angles to the spindle axes, because suitable complex controls still permit to move the workpiece as desired relatively to the active tool or the active spindle. In any event, the orientation of the axis or axes of rotation for rotating the worktable with respect to the nearest slide is optional.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for machining a workpiece on a table, comprising the steps of interchangeably inserting one of at least two tools into respective individually driven work spindles, and operating with at least one automatic tool changer with magazine such that simultaneous numerically controlled movements allows tool changing in one spindle while another spindle is operating on the workpiece such that the spindles can sequentially perform cutting with linear movements other than movements being required for tool change essentially determining the chip-to-chip time being performed parallel in time independent of total changing time, whereby said tool magazine and said spindles are mounted to be movable for selective juxtaposition of said magazine with each of said spindles, with the table having at least two linear and orthogonal axes of movement and each of the spindles being movable along at least one axis orthogonal to the at least two linear table axes.

2. A machining center for machining a workpiece, comprising at least two tools interchangeably inserted into respective individually driven work spindles, at least one automatic tool changer with a tool magazine, means for simultaneous numerically controlled movements allowing a tool change in one of the spindles while another of the spindles is engaged in chip-making such that the spindles perform the chip-making process alternately, whereby said tool magazine and said spindles are mounted to be movable for selective juxtaposition of said magazine with each of said spindles, and means for performing simultaneously the movements that determine primarily the chip-to-chip time independent of time required for tool changing via the spindles which are individually driven, wherein all movements affecting spindle changing are linear, a table has at least two linear and orthogonal axes of movement and each of the spindles are moveable along at least one axis orthogonal to the at least two linear table axes.

3. The machining center according to claim 2, wherein spindle axes are parallel to each other.

* * * * *